UNITED STATES PATENT OFFICE.

HIRAM L. WILCOX, OF LINCOLN, NEBRASKA.

TANNING EXTRACT.

SPECIFICATION forming part of Letters Patent No. 235,923, dated December 28, 1880.

Application filed November 27, 1878.

*To all whom it may concern:*

Be it known that I, HIRAM L. WILCOX, of Lincoln, Lancaster county, Nebraska, have invented a new and useful Improvement in Tanning Extracts, of which the following is a specification.

My invention consists of a solid extract of the *Polygonum amphibium* made according to the process herein described, as a new article of manufacture.

In the preparation of my new manufacture I proceed as follows: Take, say, two thousand pounds of what is known in the western part of the United States as the "tannin plant"—the *Polygonum amphibium*—and grind the same, thus completely crushing the stems thereof. Now extract this powdered plant by means of hot water and draw off the liquor, which will contain the tannin. Evaporate this liquor at the temperature of 212° Fahrenheit until the concentrated liquor has the consistency of about twelve pounds to the gallon. In this evaporation I prefer to use a kettle with a steam-jacket and steam heat. Now put this concentrated liquor into a mixing-pan and add thereto about forty or fifty pounds of the freshly-ground plant and mix the whole thoroughly together, continuing a moderate heat until the mass is sufficiently thickened to be molded into bales or blocks, and then put into sacks for shipment or transportation.

I do not claim, broadly, the process of making solid extracts of plants by mixing the aqueous extract thereof with the powdered plant, and thus forming a solid compound; but What I do claim, and desire to secure by Letters Patent, is—

As a new article of manufacture, the above-described solid block for use in tanning, consisting of a mixture of the dry and powdered *Polygonum amphibium* and a moist extract of the same plant.

The above specification of the said invention signed and witnessed at Lincoln, Nebraska, this 9th day of November, A. D. 1878.

HIRAM L. WILCOX.

Witnesses:
BENJA. F. FISHER,
JOHN GILLESPIE.